Sept. 13, 1955          H. G. ROY          2,717,420

ARTIFICIAL LUMBER PRODUCTS AND THEIR MANUFACTURE

Filed March 19, 1951          5 Sheets-Sheet 1

Inventor
Henri Georges Roy
By *Attorney*

Sept. 13, 1955 H. G. ROY 2,717,420
ARTIFICIAL LUMBER PRODUCTS AND THEIR MANUFACTURE
Filed March 19, 1951 5 Sheets-Sheet 2

Inventor
Henri Georges Roy
By
Attorney

Sept. 13, 1955          H. G. ROY          2,717,420

ARTIFICIAL LUMBER PRODUCTS AND THEIR MANUFACTURE

Filed March 19, 1951          5 Sheets-Sheet 3

Inventor
Henri Georges Roy
By (signature)
Attorney

United States Patent Office 2,717,420
Patented Sept. 13, 1955

2,717,420

ARTIFICIAL LUMBER PRODUCTS AND THEIR MANUFACTURE

Henri Georges Roy, Ste. Rose, Laval, Quebec, Canada

Application March 19, 1951, Serial No. 216,403

13 Claims. (Cl. 18—12)

INTRODUCTION

This invention relates to new wood products as an article of manufacture and to a process for making such products.

A product of this type can be described as a stable and effectively warp-proof artificial lumber. It comprises a mixture of synthetic resin and discrete wood or lignocellulosic particles, interbonded together under heat and pressure by a process of dry extrusion and thus permanently consolidated into boards and slabs of rectangular or other cross-section and of any predetermined length that will be found useful in the building arts as a substitute for natural lumber.

The product described in the subject invention can be formed advantageously from waste lignocellulosic materials such as sawdust, planer shavings, peat moss, chopped twigs, bagasse, straw and other fibrous agricultural residues. To impart greater abrasion and fire resistance to the product, complementary portions of mineral residues such as slate dust, slag, soapstone, mica flakes, asbestos fines and the like can be added to the mass of cellulosic particles prior to their consolidation into rigid boards and strips.

Prior Art

Substantially flat slabs have been formed previously by processes of hot-pressing granular materials of lignocellulosic nature and, specifically, wood waste particles and fibers with suitable synthetic resin binders. The type of product thus manufactured is essentially a rigid mass of stratified small chips and finds some use as a structural wallboard. By virtue of the fact that they are obtained merely by pressing down, to a predetermined depth and between two rigid surfaces, a mass of fibrous particles having only one degree of freedom with respect to their individual orientation, these slabs present an heterogeneous, stratified macrostructure characterized by an artificial grain direction and corresponding planes of cleavage perpendicular to the direction in which bonding pressure has been applied, namely across the board thickness.

Applicant's development

The applicant has discovered that rigid elongated boards with novel properties of appearance, density, stability and strength can be extruded successfully and economically from a mass of predominantly lignocellulosic particles and containing an adhesive binder.

The mass is inter-bonded and consolidated under at least longitudinally-applied pressure so that the board is made up of a plurality of cross-sectional laminae. The laminae comprise a planar and reticulated arrangement of inter-bonded predominately prismoidal particles conferring greater dimensional stability to the board in cross-section than in length. According to one aspect of the invention, the board is made with the longitudinally-applied pressure acting substantially alone. According to another aspect of the invention, transverse pressure is also applied to sides and edges so that the board is consolidated under conjugated triaxially-applied pressure. In the latter case the board is made up of a continuous three-dimensionally cross linked arrangement of inter-bonded prismoidal particles. The body of the latter type of board has an isotropic character and possesses equal dimensional stability along its three measurements of length, width, and thickness. According to either aspect of the invention the board is uniformally profiled along its length in transverse cross-section and can be rectangular or of other cross-section.

The invention also provides a building material slab made up of a pre-assembled plurality of boards of the type described above, juxtaposed edgewise and glued together.

The invention also includes slabs of a plurality of boards pre-assembled and edge-glued together and overlaid with facings for example of thin wood veneer in which the grain-direction of the facings coincides with the direction in which the core strips have been generated or with facings of other types of sheet material.

A further type of slab according to the invention includes an external facing of a semi-rigid sheet material, for example plywood, and a centrally located rib-like arrangement of parallel boards according to the invention spaced apart or partly spaced apart.

A further type of core material according to the invention may be a slab as described in the previous paragraph which, includes a facing of semi-rigid sheet material and internally arranged compression members in the form of rings formed by cross-cutting a continuous extruded tubular body made according to the invention.

Other aspects of the invention will be apparent from the description to follow:

The boards will, for many purposes useful in the building arts, possess distinct advantages over both ordinary wooden timbers and artificial granular boards or strips thereof made by hot- or cold-press techniques involving normally applied pressure. Thus, among the applications of the wood product of the invention are solid or hollow strips and sections for laminated panel cores, flush-type door cores, prefabricated wall and floor sectional slabs and the like; stress-free stiles, rails and other framing members; strip flooring and siding; stress-carrying members such as columns, joists, etc.

These boards are stable and effectively warp-proof and free from the natural faults of ordinary timber. An important feature of the present invention is the controlled distribution and orientation of said discrete inter-bonded particles and, when it is required by the end-use, the encasement longitudinally within the confines of the board cross-section of a filamentous stress-carrying armature.

The invention also contemplates a method of making artificial lumber products and an apparatus for use in practising this method. Details of method and apparatus are contained in the following description.

APPARATUS PROCESS

Detailed description

This specification describes a number of preferred aspects of the invention as examples. These are shown in the accompanying drawings. From a consideration of these specific examples the nature of the invention will become more apparent to those skilled in the art.

For the purpose of explaining this invention, it should be understood that all dry lignocellulosic materials, and wood in particular, expand dimensionally as they pick up moisture until they reach what is termed their fiber-saturation point. This expansion does not take place uniformly throughout the mass such as, for instance, the thermal expansion of metals. It occurs preferentially in the three spatial dimensions according to three different parameters related to the fibrous orthotropic growth structure of the plant.

Total shrinkage of normal wood from a green or moisture-saturated condition to bone dryness in the direction of the grain is only a fraction of one percent. In the radial direction, or across the bole of the tree, it averages about five percent for most American species. In the tangential direction, or along the annual growth rings, it averages about nine percent. Thus, with reference to Figure 1, a quarter-sawed board 1 shrinks and swells less in width and more in thickness than does a flat-sawed board 2. It will be also noted to remain flat. Because the cross-sectional shrinkage of the flat-sawed board 2 is a composite of radial and tangential movements it becomes cupped on drying. The greater the difference between radial and tangential shrinkage for a given species the more tendency has wood to check in drying and to cup or warp when its moisture content changes and the greater is the advantage to be gained through minimizing shrinkage in width by using quarter-sawed boards. This peculiar hygroscopic nature of wood substance constitutes the one great inherent fault of lumber for almost every use to which it is put. A good illustration of these properties is found in plywood which partially achieves a stable board by the fact that the veneers or uniform layers from which it is made are isodynamically cross-plied with respect to their grain direction.

Moreover, when native or by-product plant substance is disintegrated mechanically with a view to reduce it to a mass of useable fibers the dimensions of the ultimate particles, within the limitations imposed by the design of the shredding or milling equipment, are not altogether left to chance. The shape and size of the resulting granules and flakes are governed by the strength properties of the plant material and are thereby related to the same three axes of orthotropic growth. The relationship between longitudinal, radial and tangential strength moduli changes appreciably with the moisture content of the cellulosic substance. This explains why the grinding and like comminution of dry wood results in a large amount of fines whereas that of water-saturated wood yields many long slivers. In the production of wood fibers and particles it is a matter of common observation that, regardless of moisture content and size of the parent mass, the longest dimension of the resulting particle will coincide qualitatively with the grain direction and the smallest dimension will predominantly correspond to the radial direction of growth. The actual dimensions of the ultimate particle will vary considerably in magnitude, but its shape will tend towards a few limiting types such as the lanciform and the lamelliform and will, in all cases, be substantially prismoidal. Analogically, the broken-down particulate fibers are minute flat-sawed boards.

Figures 1, 2, 3, 4:
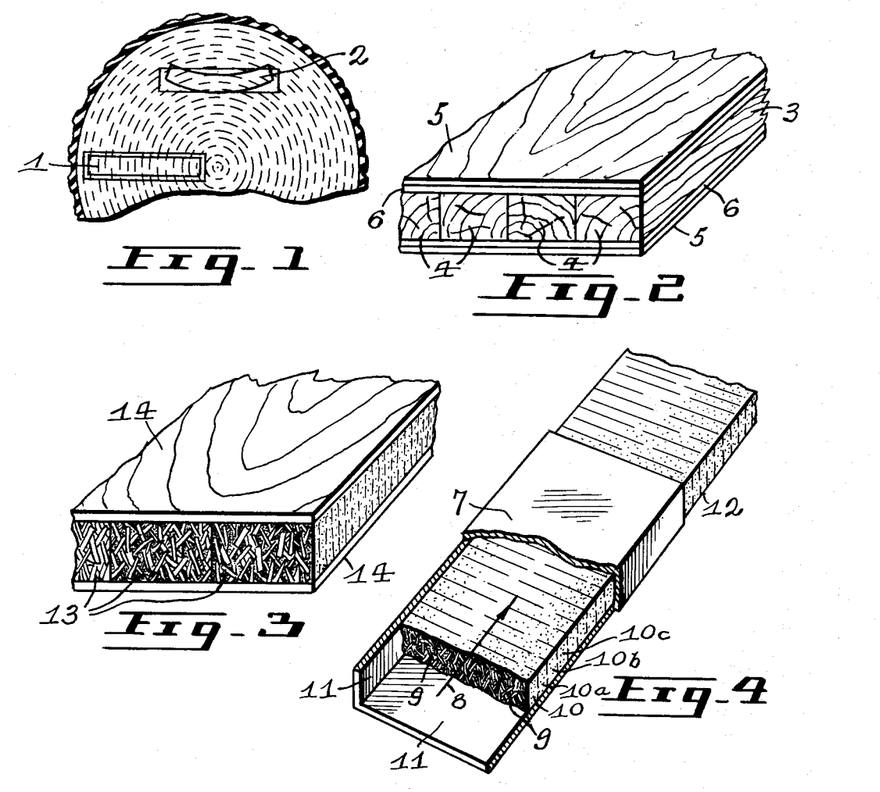
Figure 1 is a diagrammatic end elevation of a log, showing how a normal flat sawn board warps on drying, as an example of prior art boards.
Figure 2 is a perspective view of a portion of a conventional lumber core panel, again demonstrating prior art articles.
Figure 3 is a perspective view of a portion of an artificial lumber core panel according to the invention.
Figure 4 is a diagrammatic perspective of an artificial board being formed by extrusion according to the method of the invention.

For many purposes in the arts, and namely for making structural and decorative panels in furniture and building applications, it is desirable to have a strong low-cost core material over which facings of wood veneers are applied. A conventional five ply lumber core panel is illustrated in Figure 2 wherein the core 3 is made up of edge-glued random width strips of lumber 4 dressed down to a uniform thickness and used as a centrally located foundation in the construction of the panel. The narrow pieces 4 of edge-glued lumber retain their inborn propensity toward swelling and shrinking in thickness and/or width according to whether they are quarter-sawed or flat-sawed and they are rendered suitable for supporting the outer faces 5 of a decorative nature by being cross-banded i. e.: laid-over symmetrically with thin wood veneers 6, termed crossbands, the grain of which runs perpendicularly to that of the lumber core strips 4.

In order that a glued up construction, such as that illustrated in Figure 2, consisting of a plurality of cross-assembled wood layers, be and remain flat all its laminar elements must be added symmetrically in pairs about the central core. Thus decorative or utilitarian panels, comprising a heavy lumber core will generally be made up of three or five plies in all. Five ply constructions are the general rule in what the art terms lumber core panels since the outer faces, being generally of a decorative nature and relatively expensive, are too thin to restrain the lateral movement of the core strips if laid up into three ply boards.

As stated hereabove, wood waste such as sawdust and shavings and other similar materials are being bonded together into rigid slabs, with the addition of suitable binders, in hot platen presses wherein the pressure is applied normally to the main outer surfaces of the slabs. These composition boards are occasionally used as a substitute for lumber cores. It has not been found generally suitable and practical to omit the crossbands in laying up heavy panels with such artificial lumber used as coreplates. So far as I am aware, no type of synthetic board produced from interbonded cellulosic particles has heretofore been devised which, on a feasible economic scale and with an absolute minimum of waste, will constitute a coreplate of excellent physical properties.

This invention provides a satisfactory core material that can be used successfully in the fabrication of three ply panels having all the desirable characteristics of conventional five ply panels but being much cheaper than such as crossbanding veneers and additional gluelines can be safely omitted. Because interbonded particles are compacted under longitudinally-applied pressure, as hereinafter explained, an artificial grain pattern is induced within the composition in the shape of superimposed strata parallel to the board cross-section.

The artificial lumber provided by this invention shrinks and swell negligibly along its width and thickness dimensions. This is readily understood by briefly examining the mechanics involved during the course of its fabrication. Referring to Figure 4, as the mass of granular, binder-coated particles are forced through the extrusion die 7 in the direction indicated by arrow 8 under longitudinally-applied pressure, the individual particles 9 are flattened and forced into spatial parallelism with the cross-sectional plane of the die. Said particles 9, being lignocellulosic in nature and resulting from the degradation of larger plant material are, as pointed out previously, substantially fibrous and loosely prismoidal in shape. As they are flattened and forced into planar cross-sectional alignment they remain randomly orientated with respect to their longitudinal axis and, at points of mutual contact where a sufficient concentration of binder has been deposited, they become permanently welded to each other in a cross-linked, trussed lamella 10 that is dynamically non-deformable. As the extrusion process continues, numerous such reticulated lamellae 10a, 10b, 10c, etc., are formed consecutively within the peripheral limits imposed by the walls 11 of the extrusion die and, by the action of the bonding agent, become permanently superimposed upon one another to compose, collectively, the ultimate board 12. The loosely prismoidal particles 9 possess individually a grain-wise or longitudinal hygroscopic movement that is virtually nil and which they impart to the cross-sectional lamina 10 by virtue of the fact that they lie entirely within said lamina 10, that they remain in random orientation within said lamina 10, and that they are bound together into the interlocked and reticulated configuration which composes lamina 10. Thus the cross-sectional laminae 10, 10a, 10b, 10c, etc. into which the fibrous particles 9 are consolidated form, conceivably, the most dimensionally permanent arrangement comprising interbonded discrete lignocellulosic particles and the continuous juxtaposition of said lamellae into the shape of board 12 imparts to it maximum hygroscopic stability of width and thickness.

As opposed to ordinary lumber which is substantially free from hygroscopic movement in its grain or length direction, the synthetic board provided for by this invention possesses an artificially induced grain pattern that results in lengthwise swelling and shrinking. This singular property makes the board just described ideally suited for use as a coreplate in a three ply laminated panel such as illustrated in Figure 3. The maximum cross-sectional stability of core strips 13 minimizes changes in thickness of the panel and resists the across-the-grain expansion and contraction of face veneers 14. On the other hand, the longitudinal movement of the core strips 13 is restrained by the natural stability with-the-grain of the wood veneers 14. Thus, an isodynamically balanced (and thus substantially warp proof in all directions) three ply panel is constructed simply by laying face and back wood veneers 14 with their grain direction parallel to the length of the extruded and edge-glued strips 13.

Another object of this invention is to provide an outstandingly satisfactory core material in the form of extruded artificial lumber strips of indefinite length and within such cross-sectional gauge tolerances as to require no subsequent machining of faces and edge. The desired thickness is obtained by the caliber of the extrusion die and the length is infinitely variable. Because the extruded boards can be successfully edge-glued together by conventional methods any possible width of panel or coreplate can be obtained by edge-gluing the proper combination of two or three modular widths of boards. Thus, trimming waste can be held down to virtually nothing.

The invention provides an outstandingly satisfactory core material in the form of extruded artificial lumber strips in such a fashion that, due to a laminar particle orientation and reticulation parallel to the cross-section of the extruded boards and to a semi-casehardening of their outer surfaces cured in contact with a hot die, moisture absorption is materially checked. Moreover, the surfaces generated in contact with the die walls are hard and lustrous. Only the ends of the boards at points of severance from the continuous strip need further polishing.

In this core material, due to a laminar particle orientation and reticulation parallel to the cross-section of the extruded boards and to a semi-casehardening of their outer surfaces cured in contact with a hot die, cohesive strength within the board, and particularly in its subsurface areas, is extremely high. When used as the central foundation of a laminated panel between superimposed faces there exist within the core substance no planes of cleavage lying parallel to the main exterior surfaces of the panel. Consequently, any well bonded superimposed veneer ply or other sheet will not be easily torn off with failure occuring in the core structure.

Because of a laminar particle orientation and reticulation parallel to the cross-section of the extruded boards, nail penetration through the faces of the panels and into the extruded core substance is greatly facilitated and does not tend to shatter the internal fiber structure. For similar reasons the outside edges can be smoothly shaped with conventional tools such as rotating shaper and moulder cutters. Since the individual particles lie in a series of lamellae substantially parallel to the cutting edge of the knives, instead of being torn out of alignment with each other, they are more conveniently and more neatly shorn by the passage of said cutting edge. An added advantage that is gained by this internal particle arrangement is that it completely mitigates the abrasive nature of the resinous or other binder used in the artificial board substance and, thus, prolongs the life of the ordinary cutting tools that are employed in its subsequent shaping and fabrication.

The foregoing description has attempted to cover the simplest type of artificial board contemplated by this invention. It has disclosed that a plurality of edge-glued rectangular strips, cross-sectionally stabilized and longitudinally unstabilized, is eminently suitable as a coreplate that will be found useful in the manufacture of built-up panels. Many other applications, for instance: short compression members, posts, supports, spacers, and the like, of such cross-sectionally stabilized and longitudinally unstabilized boards are possible and feasible.

However, this invention also contemplates rectangular profiled and other strips of isotropic artificial lumber wherein the individual particles, loosely prismoidal in shape and thinly coated with binder, have retained their random orientation with respect to the three cubical dimensions. As stated previously, granular and fibrous lignocellulosic particles are presently being compounded with various binder substances and pressed into substantially flat slabs. Furthermore, fine and comparatively expensive fibers are being suspended in an aqueous slurry and formed into continuous boards by what is essentially a felting, or papermaking, technique. The basic shortcomings of the slabs and boards made by either process lie in the stratified assemblage of the individual particles superimposed upon one another in a polarized or stratified configuration that is brought about by either externally applied pressure or unrestrained gravitation followed by horizontal matting. Said particles are interlocked and/or interbonded together under a single degree of freedom with respect to their spatial orientation. Their individual length dimension which generally coincides with their direction of maximum tensile strength and predicates the mechanical characteristics of the ultimate board is free to align itself in any direction lengthwise or widthwise of the board dimensions. It is urged, however, to lie in a plane that is parallel to the principal faces of the board or, in other words, normal to the direction of applied pressure in the case of pressed boards or normal to the egression flow of white water in the case of felted boards. As a consequence, there are, in the main, no fibers aligned from one principal face of the board to the other in such a fashion as would impart thickness stability and resistance to cleavage. It is therefore apparent that present methods of making artificial boards from lignocellulosic granular chips and/or cellulosic threadlike fibers do not yield isotropic or physically homogeneous products.

By the invention solid boards and strips of artificial lumber are formed by interbonding lignocellulosic particles and fibers under heat and pressure in such a fashion that a calculated retention or restitution is made, in the final board structure, of the random distribution and orientation assumed by said particles and fibers while loosely heaped together under their own weight. In contrast with the aforesaid processes that simply make use of a unidirectional pressure application or its equivalent, the method and apparatus contemplated by this invention provide for the successive and cumulative application of two or three conjugated pressure strokes acting along the spatial dimensions of length, breadth and depth.

The principle of multi-directional pressure application as disclosed herein is believed to be essentially novel and of broad applicability in the conversion of lignocellulosic and like particles and fibers into rigid boards and strips endowed with predictable mechanical properties. In the case where an isotropic material is desired, e. g.: a lightweight insulating board, the three conjugated pressure applications will be substantially of equal intensity so as to provide a completely randomized orientation and distribution of interbonded particles surrounded by a maximum number of minute air-filled interstices. A different case prevails where a hard and cross-sectionally stabilized board is desired, e. g.: a core for a veneered panel. In this instance, maximum cross-sectional stability is secured by the longitudinally-applied thrust acting substantially alone. The complementary mechanisms which apply conjugated pressures perpendicularly to the faces and edges of the board pre-form are purposely restrained in their operation. In this manner, before it enters the extrusion die proper, as hereinafter described, the mass of binder-coated lignocellulosic particles is subjected to a comparatively slight cross-sectional reduction. Said slight cross-sectional reduction effects a medium concentration of material at the peripheral edges of the board profile and results in external surfaces that are smooth, true and substantially free from checks, voids and the like. Modifications of the multi-directional pressure principle to control the particle distribution and/or orientation in the production of various extruded structures from lignocellulosic and like materials in particulate form may be made.

Visualizing a loosely heaped multitude of binder-coated lignocellulosic particles, the individual dimensions of same will be found to vary considerably in magnitude. The individual shapes, however, will tend toward a few limiting types, such as the lanciform and the lamelliform, and will always be, predominantly, prismoidal. Said individual particles will be found to be in no way orientated or polarized with respect to their long dimension. They conform to an absolutely random arrangement between themselves, intersecting one another at all possible angles and pointing their long dimension in any convenient direction.

When such a loose multitude of interspersed binder-coated particles is converted by externally applied unidirectional pressure into dense slabs, such as in the conventional hot-press process, each individual particle in the mass is forced into close parallelism with the rigid platen surfaces. As densification proceeds under, say, vertically-applied pressure, the angle of repose of each particle is forcibly reduced according to the following relation:

Tg. ultimate angle of repose equals $$\frac{\text{Tg. initial angle of repose} \times \text{apparent density of loose particles}}{\text{Apparent density of finished board}}$$

As an example, a loose mass of particles weighing 10 lbs. per cu. ft. is pressed into a board that weighs 40 lbs. per cu. ft. Assuming that the loose particles lie at an average positive angle of 40° with the horizontal, they will be found in the finished board to be inclined at 12°. Such a board may show high resistance to flexural bending, but it will be conspicuously weak in thickness cohesion and dimensional stability.

In accordance with this invention, the mass of loose, binder-coated particles is densified under conditions of applied pressure that can be varied from the unidirectional to the omni-directional. If, for instance, it is desired to produce from the above mass of particles weighing 10 lbs. per cu. ft. an isotropic board that will weight 40 lbs. per cu. ft., each cubic inch of finished product will be compressed from the loose particles contained in a cube that measures 1.59 inches high. To maintain a random orientation of the particles in the extruded board, thereby securing its isotropic character, an equal degree of compression must be applied to the three cubical dimensions of length, breadth and depth. In the event that the loose, binder-coated particles are not randomly orientated initially, a compensative change can be made in the mutual relationship of the conjugated triaxial pressure applications.

Figure 5:
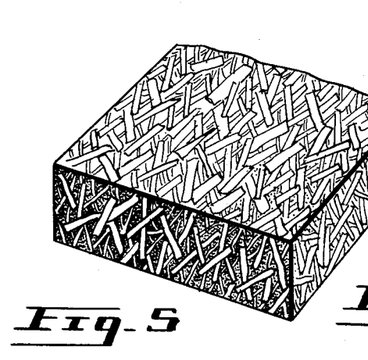
Figure 5 shows, in perspective, a portion of an artificial board according to the invention.

Such isotropic rectangular profiled boards and strips an example of which is illustrated perspectively in Figure 5 are constituted by interbonded particulate fibers having retained a random orientation with respect to the three cubical dimensions and are not characterized by any preferential plane of alignment of said internal particles. They do not possess the extreme cross-sectional stability of the type of board described previously, nor do they feature its longitudinally low flexural strength and hygroscopic movement. They are designed to be all-purpose artificial boards within the limitations imposed by the length, shape and specific gravity of the discrete particles from which they are made. They can be conveniently obtained in a wide range of physical and mechanical properties. For instance, boards in the lower density class, i. e. 15 to 25 pounds per cubic foot, have useful insulating properties; the interbonded discrete particles, apart from being oriented completely at random, are surrounded by a maximum number of minute air-filled interstices. Boards of medium density, i. e. 25 to 50 pounds per cubic foot, can be used in the numerous and well known applications of sawed or sawed and dressed lumber such as railroad crossties, sheathing, siding, flooring, concrete forms, concealed and exposed furniture parts, industrial dimension stock, crating, dunnaging, etc. Due to the homogeneous distribution and the three-dimensional cross-linking of their internal fibers, these boards are completely warp-proof and will be found in many critical applications, such as mounting boards for engraving cuts and the like, to be superior to both natural lumber and synthetic lumber internally felted or bonded under unidirectional pressure. The internal fiber structure of these boards is highly homogeneous and cohesive. It allows them, when formed in square blanks, to be mounted on a conventional lathe and turned into various useful shapes. In addition, all the exposed surfaces of said boards are smooth and dense; they can be either polished to a fine finish or successfully glued together.

Figure 6:
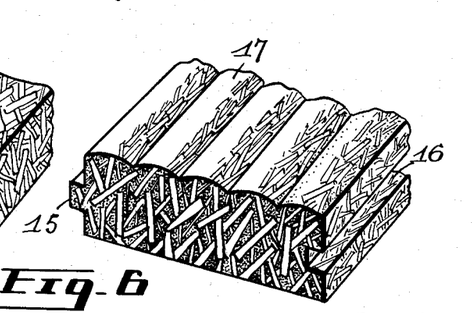
Figure 6 shows, in perspective, a reeded, tongue-and-groove board according to the invention.

Boards, particularly of the type stabilized along its three cubical dimensions as is illustrated in Figure 5 may be used as wall and ceiling panelling, flooring, exterior siding and like applications requiring large hard surfaces of pleasing appearance. These boards can be applied either singly or in an unbroken plurality pre-glued edge to edge to form super-wide units. Where individual laying is desired the boards can be advantageously extruded with a conventional tongue-and-groove or other treatment along the edges to enable them to be readily fitted together. Beyond this utilitarian edge profiling, the faces of the boards can be striated, fluted, reeded, etc. to achieve particular decorative effects. Figure 6 shows in perspective a typical extruded board, according to this invention, with integrally molded tongue 15, groove 16, and reeded surface 17.

By dying all or part of the board composition when it is in chip or fiber form or by incorporating with it various pigmented materials before it is consolidated into the shape of a rigid strip, it is possible to obtain uniformly coloured, mottled or "marble cake" effects within the extruded board and upon its surface.

An economical feature of all applications of these extruded boards is that they can be produced and supplied in any desired length. Thus, for example, flooring strips can be obtained which are pre-cut to the exact length of the room and, similarly, wall panelling can be produced to the exact ceiling height of the room as indicated on the architect's drawings.

It will be understood that this invention does not limit itself to the common square or rectangular shapes in which ordinary sawed lumber is supplied to the trade. The extruded boards or strips for which it provides can be formed in any geometrical cross-section that is desirable from esthetic, economic and engineering considerations, and that, further, lends itself to fabrication by a process of dry extrusion carried out in any direction, horizontal or otherwise. For instance staves particularly specially long ones for wooden tanks and vats can be readily extruded through a profiled die.

Figures 7, 8, 9, 10, 11, 12:
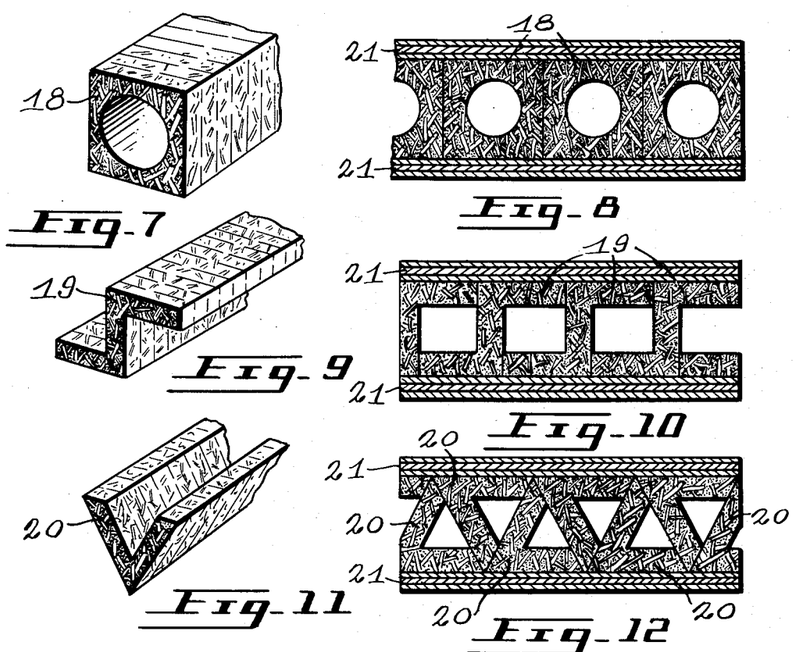
Figure 7 is a fragmentary perspective view of a hollow core according to the invention.
Figure 8 is a vertical cross-section through a form of hollow core panel made with a core like that of Figure 7.
Figure 9 is a fragmentary perspective view of another form of core according to the invention.
Figure 10 is a vertical cross-section through a panel made with a core like that of Figure 9.
Figure 11 is a fragmentary perspective view of still another form of core according to the invention.
Figure 12 is a vertical cross-section through a panel made with a core like that of Figure 11.
Figures 13, 14, 15:
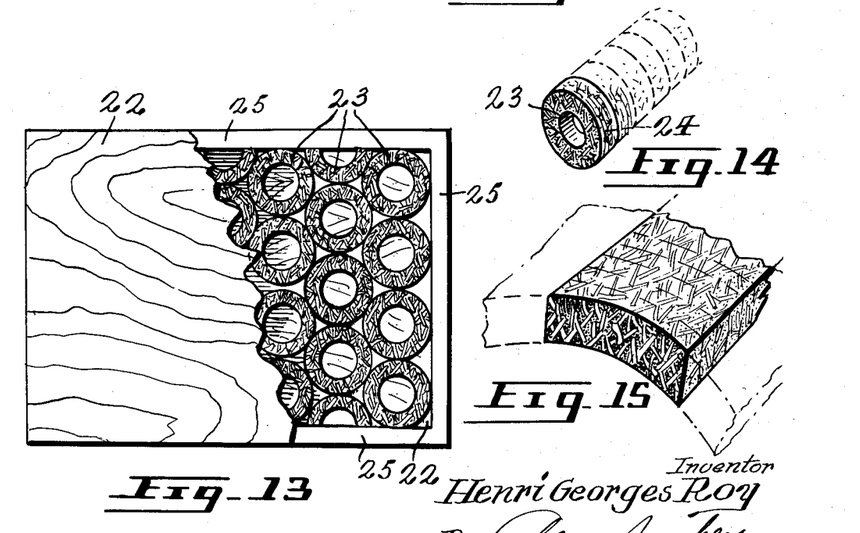
Figure 13 is a plan view of another type of hollow core panel according to the invention.
Figure 14 is a perspective view of the type of core used in the panel of Figure 13, several cores being shown before being separated.
Figure 15 is a curviate form of board particularly useful in making wood pipes and tanks.

This invention provides for extruded strips possessing high cross-sectional polar moments of inertia, a plurality of said strips being edge-glued together to provide relatively thick, hollow and lightweight slabs suitable for use as cores in stressed-skin panels such as flush doors and the like. Figures 7, 9 and 11 show diagrammatically in end elevation three examples of extruded strips 18, 19 and 20, which are edge-glued together to form the ribbed cores of corresponding building plates of Figures 8, 10 and 12 respectively. The facings 21 of these building plates are shown to be sheets of three-ply plywood. Alternatively, extruded tubes and similar shapes from binder-coated lignocellulosic fibers can be made and sectioned into rings of uniform thickness which are disposed between stressed skins to serve as lightweight spacers of high compressive strength. Figure 13 shows diagrammatically in plan view a structural hollow core panel with plywood face 22 broken away to expose the arrangement of spacer rings 23. Detail 24 is a cross-sectional view of an extruded and cut-off spacer ring 23. This type of hollow core panel will generally require banding strips 25 to provide two or more smooth and solid edges. It has the economic advantage of being easily produced in a wide range of thicknesses and the high compressive strength of the core elements resists normally applied (crushing) loads and makes it highly suited for materials handling pallets and like applications.

This invention further provides for wide slabs of edge-glued extruded strips to be used as a building material for roofs, floors, exterior walls or partitions in conventional frame structures. Said slabs will, in many cases, advantageously combine siding, sheathing, insulation and interior walls. They can be nailed, screwed or bolted to the framing and, on account of their high column strength properties, their use should result in a reduction and, possibly, complete omission of vertical framing members. When these extruded slabs are used as unit wall sections they can be bonded internally and externally with a type of adhesive binder that is completely weatherproof. Their exterior surfaces can receive such finishing treatments as paints, spar varnish, etc. or can serve as a base for concrete or stucco finishes. Their interior surfaces can likewise be finished in a variety of ways and can serve as a base for a plaster coating. For exterior wall service it will be found convenient to obtain these slabs with hollow channels through their mass. An application of a suitable asphaltic or similar coating to the inside walls of these channels will provide vapor-proof air spaces for heat and sound insulation.

A board curved or radiused transversely to its axis, as shown in Figure 15, can also be made. This type of board is particularly useful as a component of a pipe or tank. The board can be assembled and edge-connected to other boards to make a circular hollow tank or pipe. If desired one edge of the board can be tongued and the other edge grooved.

Figure 16:
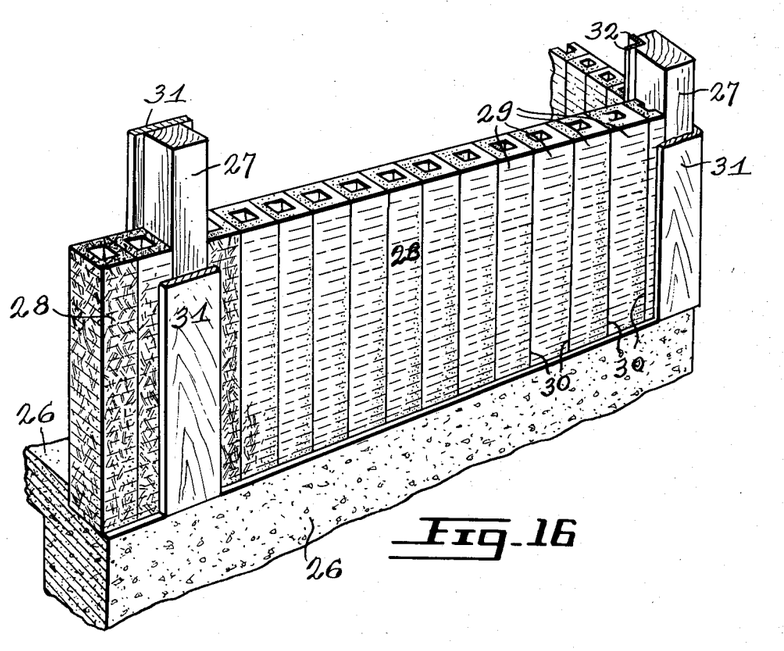
Figure 16 is a perspective view of a corner of a light frame construction building exemplifying the use of wall sections from edge-glued hollow strips according to the invention.

Figure 16 represents in perspective a corner of a light frame construction building. The concrete footing 26 supports the 4" x 4" studs 27 and 6" x 6" studs 27a on 48" centers. The unit wall slabs 28 composed of the extruded hollow strips 29 of square cross-section edge-glued together along the joints 30, have a thickness of 3⅝ inches and are retained within the studs 27 by battens 31 and corner moulding 32. It will be appreciated that such slabs 28 can be advantageously built up to a greater thickness by a simple and conventional means of gluing them plurally face to face. It should also be kept in mind that such vertical members as studs 27, battens 31 and corner moulding 32 can likewise be obtained and used as extruded sections of lignocellulosic materials as described elsewhere in this specification.

This invention further contemplates an extruded artificial board wherein the longitudinal hygroscopic movement is completely neutralized by such tension-bearing materials as iron or steel wire and the like, or manila, hemp, flax or cotton twine and the like, disposed longitudinally in continuous filaments within the confines of the board cross-section. These tension-bearing filaments can be disposed at the neutral fiber if it is desired to simply have a board that will not expand longitudinally. To take full advantage, however, of the mechanical reinforcing obtainable by the insertion of said tension-bearing filaments it is preferable to locate same at some distance from the neutral fiber of the board, in such a number and in such a geometrical configuration as strength calculations may indicate.

Figures 17, 18:
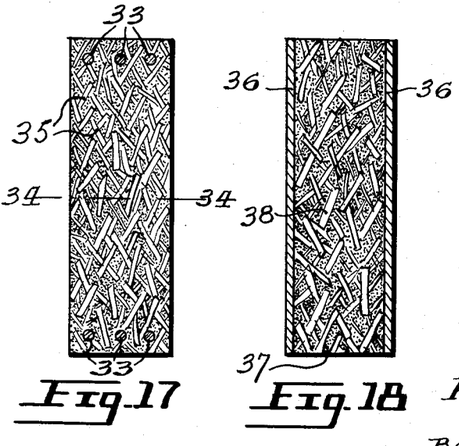
Figure 17 is an end elevation of a wire-reinforced rectangular floor joist according to the invention.
Figure 18 is an end elevation of a metal-faced sandwich board according to the invention.

Figure 17 illustrates diagrammatically an extruded board of rectangular cross-section in which are encased the metallic tension-bearing wires 33. For many applications the tension-bearing armature need only be disposed on one side of the neutral axis 34. The design calculations involved closely follow those that are currently employed in reinforced concrete design. The extruded lignocellulosic particles 35 are of such a nature as to withstand high compressive loading stresses and can be fireproofed by known methods to be admitted under the terms of the various building codes.

These tension-bearing wires and filaments can be conveniently inserted lengthwise into the board cross-section as it is being formed in the extrusion die under longitudinally-applied pressure. Thus, stress-carrying members of indefinite length can be produced. Armoured floor joists, for instance, can be made that will be squatter and more economical than conventional timber joists. As these members can be supplied to their exact final dimensions, no subsequent cutting will be done and metal wire reinforcing can be used. In certain cases, wherein the reinforced extruded section must be further cut away through the armature, vegetable fiber twines of high tensile strength can be used more conveniently as they will have no dulling effect on ordinary wood cutting tools.

Figure 18 illustrates diagrammatically an end elevation of a sandwich material comprising thin metal faces 36 bonded integrally to an extruded core strip 37 which is made up of interbonded lignocellulosic particles 38. The metal faces 36 can be of any high tensile strength material such as stainless steel, Duralumin and the like and they can be permanently applied to the artificial lumber core material while it is in the process of being formed in a suitable die. Strips of a sandwich material such as is illustrated in Figure 18 can be used with their metal sides in a vertical plane as high strength beams and joists. The high cohesive strength within the fibrous spacing material will maintain the metal facings in rigid parallelism and prevent their buckling under edgewise-applied loads. With their metallic faces in a horizontal plane these boards will show a very high stiffness factor and will, thus be found very useful in such applications as flooring and the like.

Figure 19:
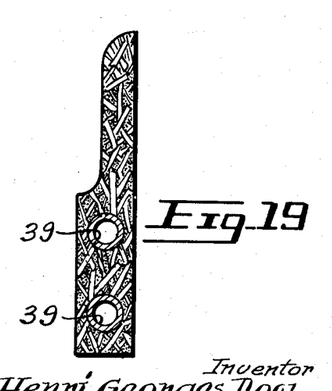
Figure 19 is an end elevation of a baseboard with encased metallic tubes according to the invention.

Figure 19 is a diagrammatic end elevation of an extruded baseboard. It serves to illustrate the broad principle that metal tubes can be encased within the confines of the artificial boards described in this invention. In this example a heating or refrigerating fluid can be circulated within tubes 39 to control the temperature of the board, and, thereby, that of the surrounding atmosphere. Alternatively, the encased tubes 39 can be used to shield electric conductors and the like.

The artificial lumber described hereabove in this specification is manufactured by a process whereby the lignocellulosic waste materials are successively shredded and classified, dried to a desired moisture content, compounded with a heat-reactive synthetic resin binder and extruded through a heated forming die. The dimensions of the finished product are determined by the cross-section of the extrusion due and the operation of a cutoff saw at a point beyond the muzzle of the machine.

*Apparatus*

Figure 20:
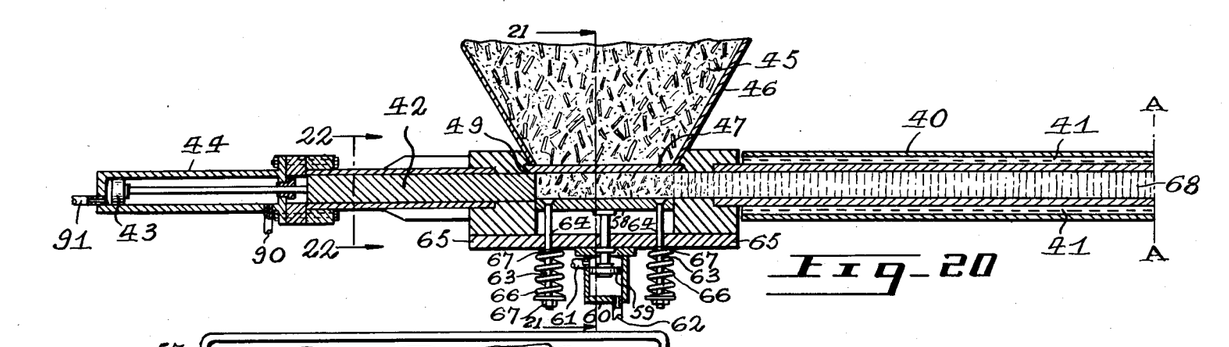
Figure 20 is a diagrammatic side elevation of one preferred form of apparatus used in the manufacture of extruded artificial lumber.
Figures 21, 22:
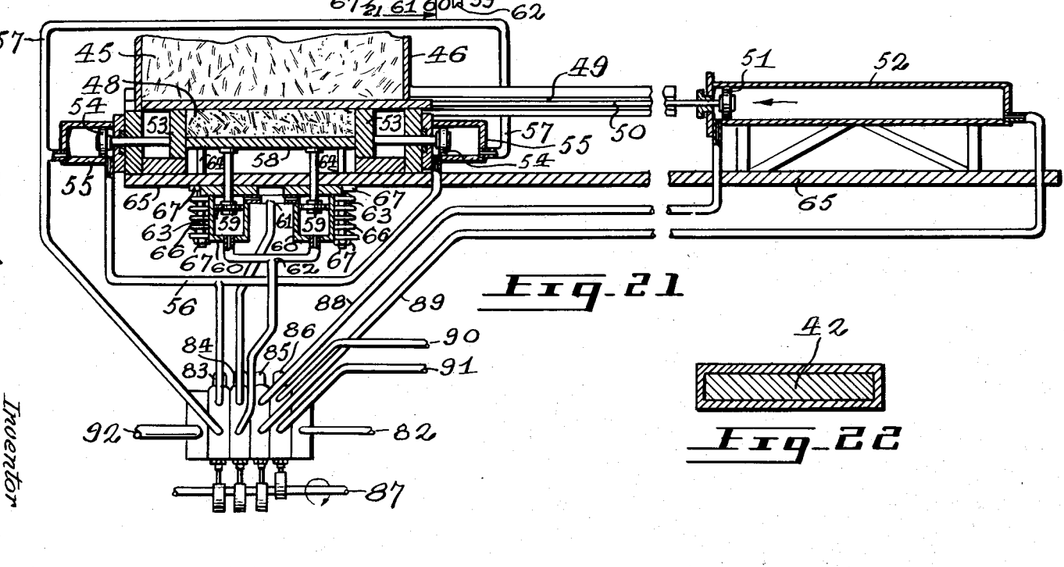
Figure 21 is a diagrammatic vertical cross-section through the loading chamber of the extruding apparatus along line 21—21 in Figure 20. Shown also in diagrammatic side elevation are the cam-actuated hydraulic valves that program the operational cycle of the apparatus.
Figure 22 is a vertical cross-section along the line 22—22 of Figure 20.

With reference to Figures 20, 22, illustrating preferred apparatus according to the invention, the essential features of the extrusion process, consist in forcing into an elongated die 40, electrically heated by strip heaters 41 (alternatively, the die can be steam heated), by a reciprocating plunger 42, hydraulically actuated by piston 43 operating within double-acting cylinder 44, a mass of binder-coated lignocellulosic particles 45 which are held in hopper 46 and, by the withdrawal of gate 47, are fed into metering and loading chamber 48. Gate 47 slides transversely on ways 49 and is connected by rod 50 to piston 51 that is free to travel within double-acting cylinder 52. Provision is made to crowd together laterally said binder coated particles held within loading chamber 48 by the movable and cooperating side walls 53 which are actuated by pistons 54 movable within double-acting cylinders 55, said cylinders being symmetrically connected to manifolds 56 and 57. In similar fashion, said binder-coated particles can, to a variable degree, be prepressed across the board thickness between gate 47 and floor 58 of loading chamber 48, said floor being actuated by pistons 59 movable within double-acting cylinders 60 interconnected to manifolds 61 and 62, said floor being, in addition, steadied laterally by rods 63 passing through channels 64 bored in base 65 of apparatus. Said rods 63 are loaded by compression springs 66 to assist pistons 59 on their return stroke. Said rods are also threaded over part of their length to carry adjusting nuts 67 whereby the limit position of floor 58 can be controlled. Similar threaded and spring-loaded rods can be advantageously used to assist pistons 54 in the operation of side walls 53.

When the desired cross-section of pre-formed board has been obtained in loading chamber 48 between gate 47, floor 58 and side walls 53, the reciprocating plunger 42 begins to exert its longitudinal thrust upon the mass of binder-coated particles which are forced against the preceding charge of material into the cavity of heated extrusion die 40 wherein interbonding and consolidation of particles are taking place. On each forward thrust of plunger 42 the extruded mass is advanced correspondingly and a portion of the semi-cured board 68 is ejected forcibly from nozzle 69 of the apparatus.

Figure 20A:
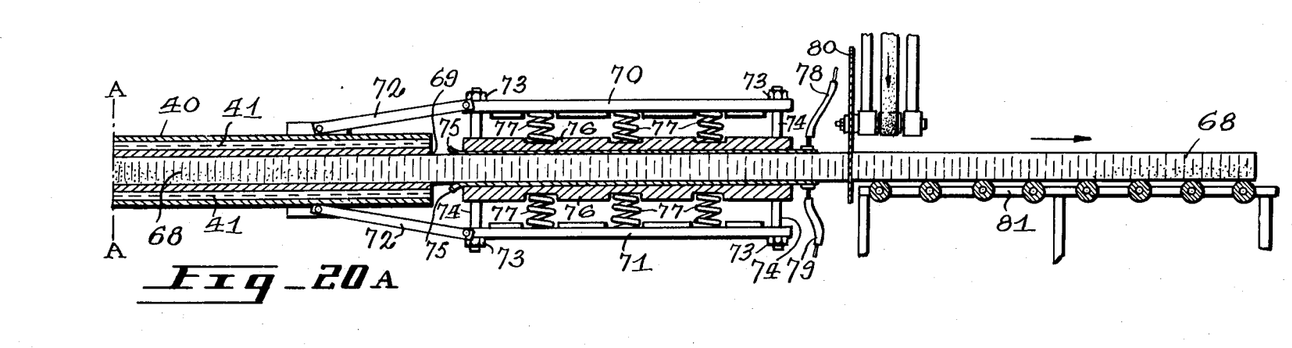
Figure 20A is a continuation of Figure 20 (shown on a separate sheet owing to its length).

After leaving the extrusion die 40, the semi-cured board 68 is forced into a retarding section 70 which regulates the intensity of the extrusion pressure used and thus largely determines the final board density. This section comprises a steel frame 71 which is linked to the body of extrusion die 40 by articulated couplings 72 and can be parially opened or closed by manipulation of nuts 73 at the ends of tie-bolts 74. The extruded board is forced between metal friction plates 75 which are, themselves, sandwiched between rigid blocks 76 under a series of opposed compression springs 77. Blocks 76 are made of a dielectric substance such as vulcanized fiber and friction plates 75 are connected by cables 78 and 79 to the output terminals of a high-frequency oscillator. In this fashion, the semi-cured extruded board 68 passes between the electrodes 75 of a high-frequency condenser and the curing of its heat-reactive binder is carried a step farther. As the substantially cured extruded board leaves retarding section 70 it is cut transversely to appropriate lengths by swing cut-off saw 80 and is carried to stockpile by roller conveyor 81.

The extruding apparatus is actuated by a hydraulic system which may employ either oil or compressed air. The working portion of an oil hydraulic circuit is illustrated in Figure 21. A supply of oil under pressure is carried by pipe 82 to double-acting control valves 83, 84, 85, 86. These valves are mounted in a bank and are stem-operated by camshaft 87 which is rotated at a desired synchronous speed. Valve 83 actuates cooperating side walls 53 by cylinders 55 to which it is connected by manifolds 56 and 57. Valve 84 actuates movable floor 58 by cylinders 60 to which it is connected by manifolds 61 and 62. Valve 85 actuates gate 47 by cylinder 52 to which it is connected by lines 88 and 89. Valve 86 actuates the main reciprocating plunger 42 by cylinder 44 to which it is connected by lines 90 and 91. Exhausted or re-cycled oil is returned through pipe 92 to the reservoir and pumping mechanism.

Figure 23:
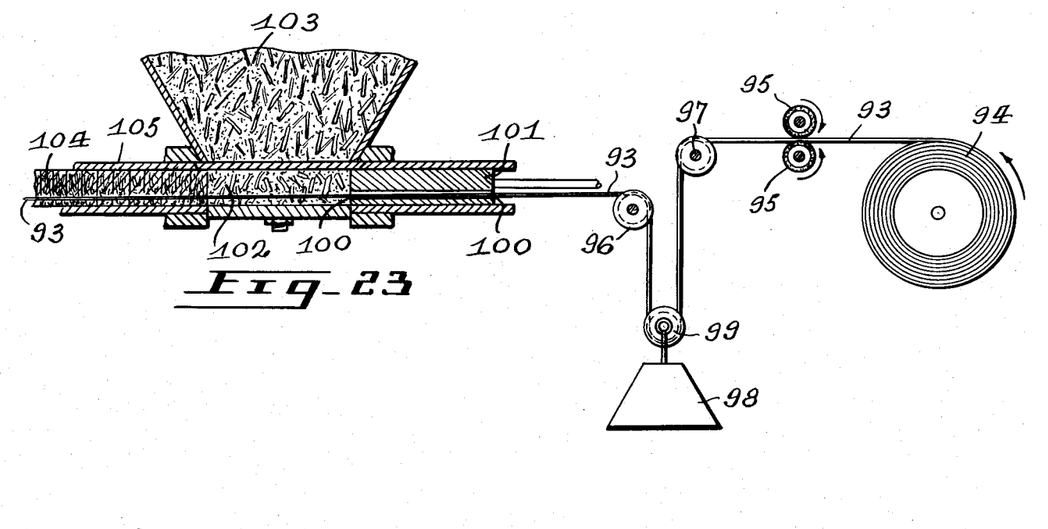
Figure 23 is a side elevation of the extruding apparatus illustrating schematically how a tension-bearing wire is inserted into the board cross-section.

Figure 23 is a schematic detail that illustrates how a tension-bearing filament such as steel wire is inserted into the cross-section of a subject extruded board while said board is in process of consolidation. Steel wire 93 is drawn at constant speed from reel 94 by power rolls 95. It is fed over pulleys 96 and 97 between which it is urged to support weight 98 suspended from pulley 99. In this fashion, it is maintained under constant tension as it is fed through duct 100 bored through reciprocating plunger 101. It continues, while taut, to longitudinally traverse loading chamber 102 wherein lignocellulosic particles 103 are compacted around it. It becomes permanently welded within the substance of board 104 as same is formed and progressed through die 105.

In practising the process, certain variable factors must be held within desirable practical limits to obtain products of maximum usefulness. It will be found that, depending on the nature of the available waste materials and on the desired physical properties of the finished board, the shape and size of the individual particles should be held within an optimum range. In general, the discrete lignocellulosic particles will pass through ¾-inch square mesh openings and will be retained on ¹⁄₁₀-inch square mesh openings. 90 percent of the particles will, preferably, range in length from ¼ to 2 inches, in width from ⅛ to ½-inch, and in thickness from ¹⁄₃₂ to ³⁄₁₆-inch. To obtain low density and/or maximum flexural strength in the extruded product it will be found advantageous to use comparatively long particles. For most applications, a lamelliform or flake particle such as is derived from chopped planer shavings is entirely suitable. If the extruded product is to bear only compressive stresses, e. g.: a four-way pallet post, then large amounts of approximately cubical particles such as ordinary wood sawdust can be readily tolerated.

The desired particle size can be obtained by subjecting the waste wood and other lignocellulosic materials to the action of a shredder or hammer mill while they are still in a green condition. Particles that are too fine are discarded, while oversize pieces are recycled through the comminuting apparatus. At this stage, the particles can be treated to improve their fire-resistance by sodium tetraborate, ammonium sulfate and like materials.

The mass of lignocellulosic particles can be dried by any conventional method. One of the most economical and satisfactory methods in present use is to submit them to one or more flash-drying passes through hot waste gases. Depending upon the nature and the water content of the binder substance that will subsequently coat them, the individual particles are preferably dried to a moisture content of four to 15 percent by weight. If it is desired to render the lignocellulosic particles less hygroscopic, they can be subjected to various chemical treatments that include coating with two to four percent by weight of conventional sizes and wax emulsions, exposure to prolonged high temperatures in a reducing atmosphere, etc.

The ideal binder should possess a high surface tension, as exhibited by good tackiness, so as to coat rather than impregnate the individual lignocellulosic particles. This property, however, should not be secured at the expense of wetting power which is also necessary to effect maximum coating of the particles. Though proteinic binders derived from milk, animal blood, soybeans, etc., can be formulated to become sufficiently heat-reactive for use in the making of the subject extruded boards, the binder substance will preferably belong to the group of thermosetting, condensation type, resins. Said resins are made by reacting an aldehyde, generally formaldehyde, or a polymer thereof, with one or more of the following organic compounds: phenol, resorcinol, cresol, urea, melamine, etc. An additional feature of an ideal resinous binder is that it will not, while curing, give off excessive amounts of water and formaldehyde as this generally results in porous resin deposits at the interfaces of the particles and yields friable boards of low mechanical strength.

A suitable urea-formaldehyde binder can be conveniently prepared in the following manner:

600 pts. by wgt. of commercial dimethylolurea (M. P. 120° C.),
75 pts. by wgt. of crystal urea,
15 pts. by wgt. of sodium acetate, and
300 pts. by wgt. of water are mixed and dissolved together at 95° C.

A condensing agent such as lactic acid is added to the solution in sufficient amount to effect a drop of 2.5–3 units on the pH scale. The reaction is carried out at 105°–110° C. for 20 to 60 minutes until the desired degree of tackiness is developed. The mass is then neutralized and cooled, using an aqueous solution of sodium carbonate. The binder syrup, thus prepared, will have a solids content of approximately 65% and possess a usable life of six weeks at room temperature. At time of use, 100 parts of resin syrup can be activated by mixing with 20 parts of water in which has been dissolved one to three parts of an ammonium salt of a strong acid, e. g.: ammonium chloride.

It has been found that spraying is the best method of applying a liquid binder to the lignocellulosic particles. Resinous binders can, alternatively, be prepared in the form of dry powders or foams and applied in a different fashion. In general, the binder concentration can be varied from five to 25 percent of the weight of the finished boards, on the basis of its solids content. The economics of most artificial board processes impose to the binder concentration an upper limit of about 15 percent. For the subject extruded artificial lumber the preferred range lies between seven and 12 percent. While the binder is being applied to the particle mass, a small amount, e. g.: one quarter of one percent to one percent by weight of the finished boards, of a lubricating agent such as zinc stearate can be dispersed therein to prevent fouling of the die surfaces.

The extrusion apparatus can be made from fabricated steel plate or any other suitable material. The die cavity and the movable parts of the loading chamber can be surface-hardened by various treatments such as chromium plating, etc. A small amount, from 0.1 to 0.8 percent, of cross-sectional shrinkage takes place within the extruded shape as it traverses the heated die. This is effectively compensated for by designing the die walls to converge together by a corresponding amount.

The density of the extruded products obtained from ordinary wood waste will vary between 15 and 65 pounds per cubic foot. The reciprocating plunger within the machine will exert upon the composition pressures in the order of 50 to 400 pounds per square inch. Exit rates from the extrusion die of from one half to ten inches per minute are possible. Full curing of a ¾-inch thick extruded section should be accomplished after six minutes of contact with die walls maintained at 275° F.

Greater speeds of cure can be achieved, as illustrated in Figure 15, by passing the partially cured extruded board through a high frequency electrostatic field. When subjected, as dielectrics, to frequencies of five to 20 megacycles, the polar molecules of the resinous binder are critically oscillated and subjected to inter- and intramolecular friction. Their temperature rises sharply until, within a few seconds time, they become irreversibly gelled. This heating is internal in nature and occurs without regard to the thickness of the board section. It is therefore advantageous to couple a high-frequency generator and diathermic unit to a heated die extrusion machine. A rapid case-hardening of the extruded section takes place in the die proper and when said extruded section becomes firm enough to resist external pressure it enters the electrostatic field of the retarding section wherein the central portion of the board section becomes, in its turn, fully cured and consolidated.

The extrusion process described in this invention produces artificial boards that are most uniform in thickness. Boards made under normally applied pressure, according to the conventional process, must be preformed in large pans or elsewhere to a depth many times greater than their final thickness. It being extremely difficult to spread loose, binder-coated particles to an absolutely uniform weight per unit of pan surface, when the preformed mass is subjected to full pressure, the individual particles are squeezed down together to a predetermined slab thickness and the density of the resulting board will depend upon the concentration of material in the pre-form. To the extent that variations of mass exist in the pre-form, the pressed board will display internal variations of density that are causative of warping and which, on moisture pickup, will result in actual thickness variations. The extrusion of artificial boards according to this invention features the application of 37 to 100 percent of the total energy of compression by the longitudinal thrust of the reciprocating plunger upon a comparatively small area, in effect, that of the board cross-section. In addition, the pre-forming phase of the extrusion process is not physically distinguishable from the pressing operation itself. By imposing these space and time restrictions to the formation of extruded products, the probability that random material concentrations of a discontinuous nature will develop in the board structure and give rise to the aforementioned disadvantages is, thus, reduced to the very minimum.

Moreover, because the artificial board made according to this invention is formed by an extrusion process, the lignocellulosic particles are not compressed directly between two rigid surfaces such as conventional press platens. They are compressed against one another while in a semi-plastic condition as they are progressed through the heated die. The mass of particles, in the course of interbonding, is subjected to a pressure which is hydrostatic in nature and does not exceed in intensity the resistance offered by the die cavity and other mechanical devices, if any, located outside and beyond the die proper and designed to retard the emergence of the board and, thereby, control its density. No localized overcompression of lignocellulosic particles can accidentally occur within the board structure to be followed, eventually, by a return to equilibrium and to the undesirable increase in thickness which is generally described as springback.

Another advantage of this process is to achieve a uniform internal distribution of discrete lignocellulosic particles with respect to their individual size. When artificial boards are made by the ordinary process wherein vertical pressure is applied normally to their principal surfaces, the smaller particles, by a sifting action, gravitate downwards to the bottom of the mass. This results in subsurface areas on opposite sides of the boards possessing different densities and, therefore, different strength properties. The unbalanced outer fiber strengths in the two opposite faces render the boards subject to warping. A striking disadvantage of these artificial boards is the appearance of their lower surface which, comprising the smallest particles, is of a crumbly nature and "flakes off" easily. In the case of artificial boards, on the other hand, manufactured by horizontal extrusion according to this invention, the mass of individual lignocellulosic particles is compressed in virtually a continuous fashion within a relatively very small space wherein size stratification due to a downward migration of the smaller particles is minimized. The subject extrusion process can, furthermore, to be operated in a vertical and downward direction and result in an absolutely random dispersion of particle sizes and a better over-all flow of material in the compacting of boards of complex profile.

This extrusion process produces uniform textured, stress-free and warp-free artificial boards by the use of pulsating pressure. This is accomplished by metering the successive and incremental charges of particles to an optimum volume and compressing them into and through the extrusion die by a reciprocating plunger. Thus, the particles, while coated with a binder that is still in a fluid condition, are given the opportunity to adjust themselves to one another and pack themselves together uniformly during the preliminary stages of interbonding. A further advantage to the use of pulsating pressure over the constant pressure applied by the screw feed mechanisms of commonly used extruders is that water vapor and other volatile substances that are generated in the mass while same is being subjected to curing temperatures can diffuse freely between the particles and escape before final interbonding and consolidation have been accomplished. This breathing action prevents the formation of water vapor pockets within the board texture, which have, at temperatures in excess of 212° F., corresponding pressures above atmospheric. In the conventional processes whereby the bonding pressure is maintained constant until it is suddenly released when the board is completed, minute vapor pockets of this nature and droplets of superheated liquid expand explosively and rupture the internal structure of the board.

It will be apparent to those skilled in the art that this invention provides a realistic approach to the utilization of lignocellulosic and like waste materials at the many geographical points where said waste materials occur. The useful and novel items of manufacture described hereabove will be found, in many cases, of a co-product nature and should, therefore, be readily marketable. The process for making said useful and novel items of manufacture is both inexpensive and flexible. It can be implemented and operated on a basis of low capital investment and minimum distribution costs. This economic advantage will be immediately appreciated by the numerous parties concerned with the problem of waste lignocellulosic materials, but particularly heedful of the vast capital outlay required to organize the manufacture and marketing of conventional artificial lumber.

It is to be understood that this invention is not limited to the specific embodiments described in the foregoing specification and illustrated in the accompanying drawings otherwise than necessitated by the prior art and it includes within its purview whatever modifications that come either within the terms or the spirit of the following claims.

I claim:

1. An apparatus for producing artificial lumber comprising in combination an elongated forming die made up of spaced apart heating element and side members in connection with such forming die a loading chamber formed by a movable floor and pressure means urging said floor inwards movable walls at each side of the loading chamber and pressure means for moving said walls inwardly, a gate above said loading chamber, a hopper above the gate, and means for controlling the gate whereby the material may be passed from said hopper into the loading chamber, and a plunger adapted to enter the loading chamber and move through it towards and in line with said forming die, and pressure means for actuating said plunger.

2. An apparatus according to claim 1 which includes a retarding device subsequent to said forming die, said device including a pair of spaced apart metallic friction plates, the plates constituting the plates of a condenser, the plates being connected to a high frequency oscillator whereby high frequency current is passed between such plates, spring means for urging such plates against the surface of the board as it comes out of the feeding die and means for adjusting the pressure exerted between said plates.

3. An apparatus, according to claim 1, in which the plunger includes an elongated channel extending in the longitudinal direction for carrying through it a filament, and behind said plunger a pair of guide rolls to guide the filament, weighing means between the guide rolls, and a pair of feed rolls and a reel leading to said feed rolls, whereby the filament may be fed.

4. An apparatus for producing artificial lumber, according to claim 1, which includes in advance of said die a retarding section comprising opposed members adapted to act on opposite sides of the formed lumber, including a pair of plates, and means for urging said plates against the lumber.

5. An apparatus, according to claim 1, in which said pressure means is reciprocating and pulsating.

6. A continuously operable extrusion process of making artificial lumber from a mass of predominantly prismoidal lignocellulosic particles, comprising the steps of thinly coating the individual particles with a film of heat-reactive binder, disposing in metered, incremental quantities the mass of binder-coated particles within a collapsible chamber, therein randomizing the spacial orientation of the individual binder-coated particles and collocating same by successively acting and conjugated side, top and forward pressure applications, said forward pressure application expelling the mass of binder-coated particles from said collapsible chamber into an abutting, open-ended die, therein heating the mass of collocated binder-coated particles, effecting the permanent interbonding and consolidation of said particles, thereby forming a continuous rigid body of artificial lumber, further expressing said body of artificial lumber through and beyond said open-ended die against an adjustable, frictional back-pressure, controlling the ultimate density of said body of artificial board by adjusting said frictional back-pressure and severing into useful lengths said body of artificial lumber as it is being extruded from said open-ended die.

7. A continuously operable extrusion process of making artificial lumber from a mass of predominantly prismoidal lignocellulosic particles, comprising the steps of thinly coating the individual particles with a film of heat-reactive binder, disposing in metered, incremental quantities the mass of binder-coated particles within a collapsible chamber, therein randomizing the spacial orientation of the individual binder-coated particles and collocating same by successively acting and conjugated side, top and forward pressure applications, said forward pressure application expelling the mass of binder-coated particles from said collapsible chamber into an abutting, open-ended die, therein heating the mass of collocated binder-coated particles, effecting the permanent interbonding and consolidation of said particles thereby forming a continuous rigid body of artificial lumber, further expressing said body of artificial lumber through and beyond said open-ended die against an adjustable, frictional back-pressure, controlling the ultimate density of said body of artificial board by adjusting said frictional back-pressure and severing into useful lengths said body of artificial lumber as it is being extruded from said open-ended die.

8. A continuously operable extrusion process of making artificial lumber from a mass of predominantly prismoidal lignocellulosic particles, comprising the steps of thinly coating the individual particles with a film of heat-reactive binder, disposing in metered, incremental quantities the mass of binder-coated particles within a collapsible chamber, therein crowding together and collocating the individual binder-coated particles by successively acting and conjugated side, top and forward pressure applications, said forward pressure application moreover expelling the mass of binder-coated particles from said collapsible chamber into an abutting, open-ended die, therein heating the mass of collocated binder-coated particles, effecting the permanent interbonding and consolidation of said particles, said forward pressure application being cyclic and pulsating, said forward pressure application cooperating cumulatively against an adjustable, steady, frictional back-pressure, permitting said particles to adapt themselves to one another, minimizing localized over-compression stresses within, and permanent deformation of, said particles thereby forming a continuous stress-relieved, rigid body of artificial lumber, controlling the density of said body of artificial lumber by adjusting said frictional back-pressure, further expressing said body of artificial lumber through and beyond said open-ended die and severing into useful lengths said body of artificial lumber as it is being extruded from said open-ended die.

9. A continuously operable extrusion process of making artificial lumber from a mass of predominantly prismoidal lignocellulosic particles, comprising the steps of thinly coating the individual particles with a film of heat-reactive binder, disposing in metered, incremental quantities the mass of binder-coated particles within a collapsible chamber, applying a controlled degree of transverse pressure from two perpendicularly related directions to said mass of particles, to densify the sub-surface areas of said mass of particles and to eliminate voids and checks along the external surfaces and edges of said mass of particles, applying forward pressure to said mass of particles, expelling said mass of particles from said collapsible chamber into an abutting, open-ended die, therein heating the mass of binder-coated particles, effecting their permanent interbonding and consolidation thereby forming a continuous, smooth-surfaced, rigid body of artificial lumber, further expressing said body of artificial lumber through and beyond said open-ended die against an adjustable, frictional back-pressure, controlling the ultimate density of said body of artificial lumber by adjusting said frictional back-pressure and severing into useful lengths said body of artificial lumber as it is being extruded from said open-ended die.

10. A process of extrusion to form artificial lumber comprising, carrying out an initial operation of providing in a first elongated enclosure zone, closed at top, bottom and sides but open at both ends, an initial elongated mass of interbonded and consolidated lignocellulosic particles and a resin binder, said mass blocking said open ends and frictionally held in the enclosure zone by contact with said sides, top and bottom, then intermittently carrying out in a number of sequential steps a second operation of feeding an increment portion of binder-coated lignocellulosic particles into another enclosure zone forming a continuation of said first enclosure zone and adjacent to one of said ends, compressing said increment portion in a first direction transverse to the length of said enclosure zones, while preventing the escape of said portion in any direction, compressing the said increment portion in a second direction transverse to the first direction and to the length of the enclosure zones while preventing escape of the portion, then subjecting the increment portion to pressure lengthwise of said enclosure zones to force it against and consolidate it with the initial and previously formed increment portions and said initial elongated mass to form an integrated continuous body and to force said integrated body forward from said first enclosure zone.

11. A process of extrusion of artificial lumber, according to claim 10, in which the forming pressure includes applying adjustable frictional resistance to the surfaces of the preformed mass.

12. A process of extrusion of artificial lumber, according to claim 10, in which the forming pressure is pulsating.

13. A process of extrusion according to claim 10 in which the axis of the said enclosure zones is in an acutely downward direction whereby when the increment portions of binder-coated lignocellulosic particles are fed, said particles fall forward under their own weight in the same direction as the movement of the integrated body.

References Cited in the file of this patent

UNITED STATES PATENTS

| | | |
|---|---|---|
| 1,054,464 | Soucek | Feb. 25, 1913 |
| 1,370,800 | Egerton | Apr. 8, 1921 |
| 1,825,877 | Loetscher | Oct. 6, 1931 |
| 1,855,161 | Wyman | Apr. 19, 1932 |
| 1,862,947 | Smith et al. | June 14, 1932 |
| 1,890,802 | Apple | Dec. 13, 1932 |
| 1,959,375 | Loetscher | May 22, 1934 |
| 1,969,291 | Antoni | Aug. 7, 1934 |
| 2,012,805 | Brown et al. | Aug. 27, 1935 |
| 2,200,650 | Welch | May 14, 1940 |
| 2,280,022 | Banigan | Apr. 14, 1942 |
| 2,296,516 | Goss | Sept. 22, 1942 |
| 2,332,170 | Sapp | Oct. 19, 1943 |
| 2,347,697 | Levey | May 2, 1944 |
| 2,446,644 | Fischer | Aug. 10, 1948 |
| 2,465,348 | Boehm et al. | Mar. 29, 1949 |
| 2,485,523 | Ashbaugh | Oct. 18, 1949 |
| 2,578,781 | Brundige | Dec. 18, 1951 |
| 2,580,200 | Shrimpton | Dec. 25, 1951 |
| 2,592,470 | Ryberg | Apr. 8, 1952 |
| 2,649,034 | Gramelspacher | Aug. 18, 1953 |

FOREIGN PATENTS

| | | |
|---|---|---|
| 651,489 | Great Britain | May 22, 1944 |
| 608,252 | Great Britain | Sept. 13, 1948 |